Nov. 2, 1943.　　　R. B. WORDEN　　　2,333,503
SNELLED HOOK
Filed Feb. 18, 1941
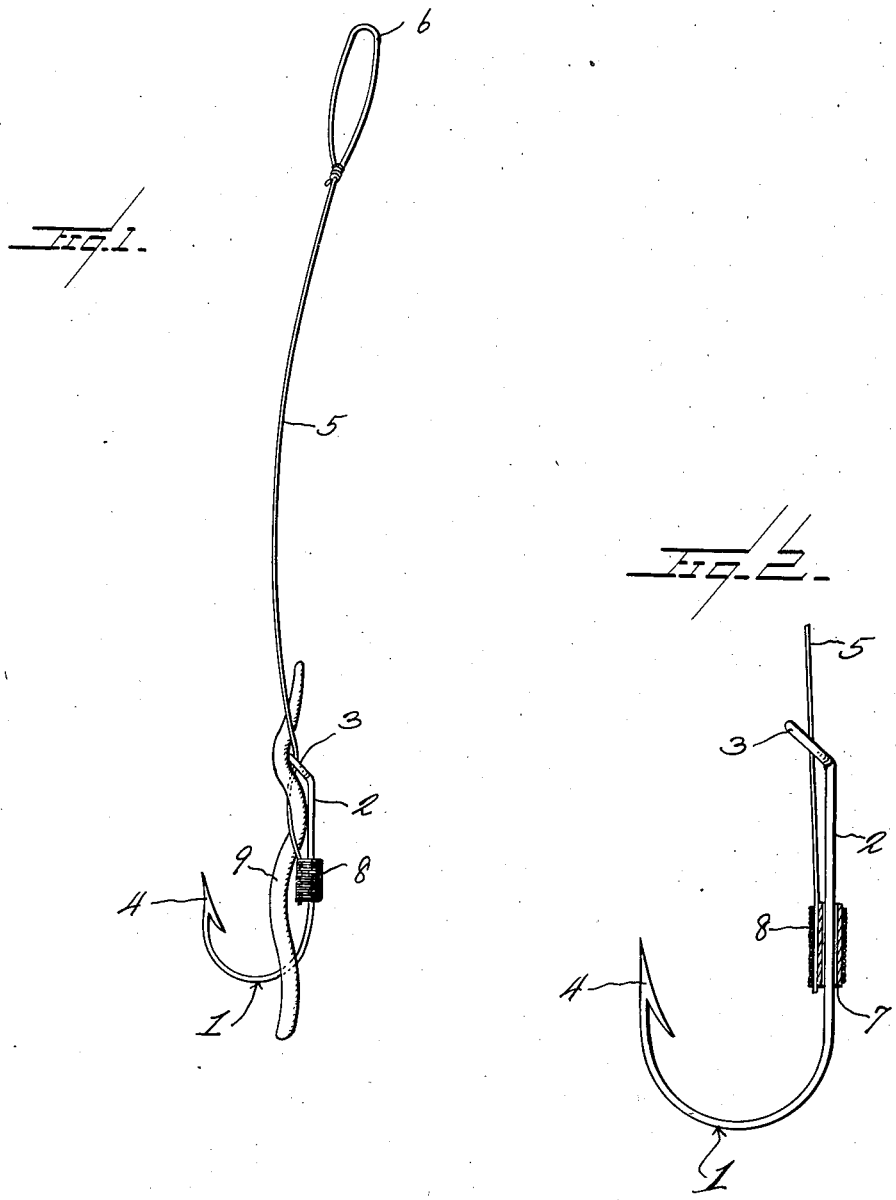
Inventor
R.B. Worden
By Watson E. Coleman
Attorney Patented Nov. 2, 1943

2,333,503

UNITED STATES PATENT OFFICE 2,333,503

SNELLED HOOK

R. B. Worden, Granger, Wash.

Application February 18, 1941, Serial No. 379,490

1 Claim. (Cl. 43—28)

This invention relates to the class of fishing tackle and pertains particularly to improvements in snelled hooks.

The principal object of the present invention is to provide an improved snelled hook having all of the strength and appearance of snelled hooks of the usual design or construction, in which the snell is attached to the shank portion of the hook in such manner as to permit it to be freely shifted on such shank with respect to the eye of the hook through which the snell passes so as to make it possible to secure the bait between the shank of the hook and the snell, so that while the bait performs its usual function of enticing the fish to take the hook, it will be secured in such a position that it is not likely to be torn off from the hook when the latter is taken by a fish, and thus the bait may be used over again whereas it is ordinarily impossible to use bait the second time when it is placed on the barb of the hook in the customary manner.

Another object of the invention is to provide a snelled hook in which the snell is secured to a sleeve or cylinder encircling shank of the hook and which is free to move on the shank so that relative movement between the hook and the snell may be easily and quickly effected and such movement will not cause wear on the snell or the binding by which the snell is secured to the hook body.

The invention will be best understood from a consideration of the following detailed description taken in connection with the accompanying drawing, it being understood, however, that the invention is not to be considered as limited by the specific illustration or description but that such illustration and description constitutes a preferred embodiment of the invention.

In the drawing:

Fig. 1 is a view in side elevation of the hook embodying the present invention showing bait applied thereto.

Fig. 2 is a detailed sectional view on an enlarged scale.

Referring now more particularly to the drawing, the numeral 1 generally designates a hook of usual form in which the relatively straight shank portion 2 is provided at one end with an angularly directed eye 3, while at the other end is the usual barbed tip 4. The numeral 5 designates the gut snell which is looped at its upper end in the customary manner as indicated at 6.

In accordance with the present invention, the snell is passed through the eye 3 of the hook and there is closed around the shank portion 2 of the hook, a split tube of a suitable material such as quill, which is indicated by the numeral 7. The end of the snell 5 is disposed longitudinally along the side of the quill tube or sleeve 7 and is secured thereto by the binding or whipping 8 which completely encases the quill and covers the end of the snell. This whipping may then be coated with a suitable water-proof material which will also function as a binder or adhesive, such material being commonly employed in the manufacture of fish lures.

As shown in Fig. 1, the quill sleeve may readily be shifted longitudinally of the hook shank so as to bow the snell outwardly from the shank to permit the bait, herein indicated as an angle worm 9, to be threaded around the snell between the latter and the shank 2 of the hook. It will be readily seen that when the hook and the snell are pulled apart, the sleeve will ride up on the shank and the bait will be firmly bound or cinched between the snell and the hook body.

With the arrangement here illustrated and described, it will be seen that the bait while being supported upon the hook in a manner which will effectively attract the fish, will not interfere with the hooking of the fish since the bait does not cover the pointed end of the hook. Also it will be readily apparent that with this arrangement, the fish may take the hook without destroying the bait and thus the bait may be used a number of times.

What is claimed is:

A snell hook, comprising a hook body having a straight shank portion and an eye at one end, a snell having an end extending through said eye, a sleeve encircling the shank portion of the hook, said end portion of the snell being disposed longitudinally of the sleeve, and whipping encircling the sleeve and the end of the snell to bind the sleeve and snell together.

R. B. WORDEN.